(12) United States Patent  
Chan et al.

(10) Patent No.: US 9,348,867 B2  
(45) Date of Patent: May 24, 2016

(54) METHOD FOR USING MULTIPLE PLANS TO ACHIEVE TEMPORAL AND ARCHIVE TRANSPARENCY PERFORMANCE

(71) Applicant: International Business Machines Corporation, Armonk, NY (US)

(72) Inventors: Frank Chan, San Jose, CA (US); Yao-Ching S. Chen, Saratoga, CA (US); Tammie Dang, Morgan Hill, CA (US); Xiaohong Fu, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 14/179,584

(22) Filed: Feb. 13, 2014

(65) Prior Publication Data

US 2015/0227560 A1  Aug. 13, 2015

(51) Int. Cl.  
*G06F 17/30* (2006.01)

(52) U.S. Cl.  
CPC .... *G06F 17/30463* (2013.01); *G06F 17/30309* (2013.01)

(58) Field of Classification Search  
CPC ................................................. G06F 17/30309  
USPC ......... 707/706, 713–719, 722, 736, 758, 781, 707/999.002  
See application file for complete search history.

(56) References Cited

U.S. PATENT DOCUMENTS

| 8,046,354 B2 | 10/2011 | Day et al. |
| 2008/0133456 A1* | 6/2008 | Richards et al. .................. 707/2 |
| 2012/0005189 A1 | 1/2012 | Yu et al. |
| 2013/0132405 A1 | 5/2013 | Bestgen et al. |
| 2013/0346988 A1* | 12/2013 | Bruno et al. .................. 718/102 |

* cited by examiner

*Primary Examiner* — Syling Yen  
(74) *Attorney, Agent, or Firm* — Edward P. Li

(57) ABSTRACT

An approach for using multiple plans in a database management system to access current data and history data is provided. The approach provides a first access plan for a query, stores the first plan as a first section in an application package. The first access plan is capable of accessing the current data. The approach determines whether a bind option for the query is detected. In response to determining that the bind option is detected, the approach provides a second access plan for the query and stores the second access plan as a second section in the application package. The second access plan is capable of accessing the current data and the history data.

9 Claims, 3 Drawing Sheets

METHOD FOR USING MULTIPLE PLANS TO ACHIEVE TEMPORAL AND ARCHIVE TRANSPARENCY PERFORMANCE

TECHNICAL FIELD OF THE INVENTION

The present invention relates generally to a database management system, and more particularly to a method for using multiple plans to achieve temporal and archive transparency performance.

BACKGROUND

In an environment where database users store both active and history data in related tables, the users often need to query and access data from both tables using certain criteria via static SQL (Structured Query Language) statements. One of criteria may be a specific time from the active table or the system temporal table (STT) and optionally from the table containing the history data (history table). The users intend to get data at different points of time from these temporal tables without changing the underneath static SQL statements. For example, in a scenario where a user has a packaged application, the user intends to run against the state of the business as of today, against the state of the business as of the end of last quarter, or against the state of the business as of last year. Changing the application and adding as of period specifications to each static SQL statement in the application may not be possible in case of the packaged application. This requirement is referred to as a "time machine" in a database management system where history data may need to be looked up in order to return all results.

To support such a requirement, a database management system needs to recompile the static SQL statement when the demanded time period is specified before execution, which significantly increases the SQL execution time. For example, the query is bound with access to the active table only. Then, at execution time, once the system detects that history data is needed, the query is incrementally rebound so that the history table is also looked up. This is an expensive process because each time the query is executed and the incremental bind process is activated.

Another alternative is to always prepare a bound form of the SQL statement with "UNION ALL" between the active and history data, and add a pruning predicate to optionally remove the history table look-up at the execution time. A drawback of this approach is that extra storage is needed for the bound form of the SQL (which includes "UNION ALL") and the unnecessary time is needed for loading such extra storage into memory. The "UNION ALL" operation in a query is often a performance overhead and can affect other access path selections. When an instance of the execution of the packaged application does not require history data, the "UNION ALL" access plan is still in effect and can affect performance of the query.

SUMMARY

In one aspect, a computer-implemented method for using multiple plans in a database management system to access current data and history data is provided. The computer-implemented method comprises providing a first access plan for a query, storing the first plan as a first section in an application package, determining whether a bind option for the query is detected, providing, in response to determining that the bind option is detected, a second access plan for the query, and storing the second access plan as a second section in the application package. The first access plan is capable of accessing the current data, and the second access plan is capable of accessing the current data and the history data.

In another aspect, a computer program product for using multiple plans in a database management system to access current data and history data is provided. The computer program product comprises a computer readable storage medium having program code embodied therewith. The program code is executable to provide a first access plan for a query, store the first plan as a first section in an application package, determine whether a bind option for the query is detected, provide, in response to determining that the bind option is detected, a second access plan for the query, and store the second access plan as a second section in the application package. The first access plan is capable of accessing the current data, and the second access plan is capable of accessing the current data and the history data.

In yet another aspect, a computer system for using multiple plans in a database management system to access current data and history data is provided. The computer system comprises one or more processors, one or more computer-readable tangible storage devices, and program instructions stored on at least one of the one or more computer-readable tangible storage devices for execution by at least one of the one or more processors. The program instructions are executable to provide a first access plan for a query, store the first plan as a first section in an application package, determine whether a bind option for the query is detected, provide, in response to determining that the bind option is detected, a second access plan for the query, and store the second access plan as a second section in the application package. The first access plan is capable of accessing the current data, and the second access plan is capable of accessing the current data and the history data.

DETAILED DESCRIPTION

Figure 1:
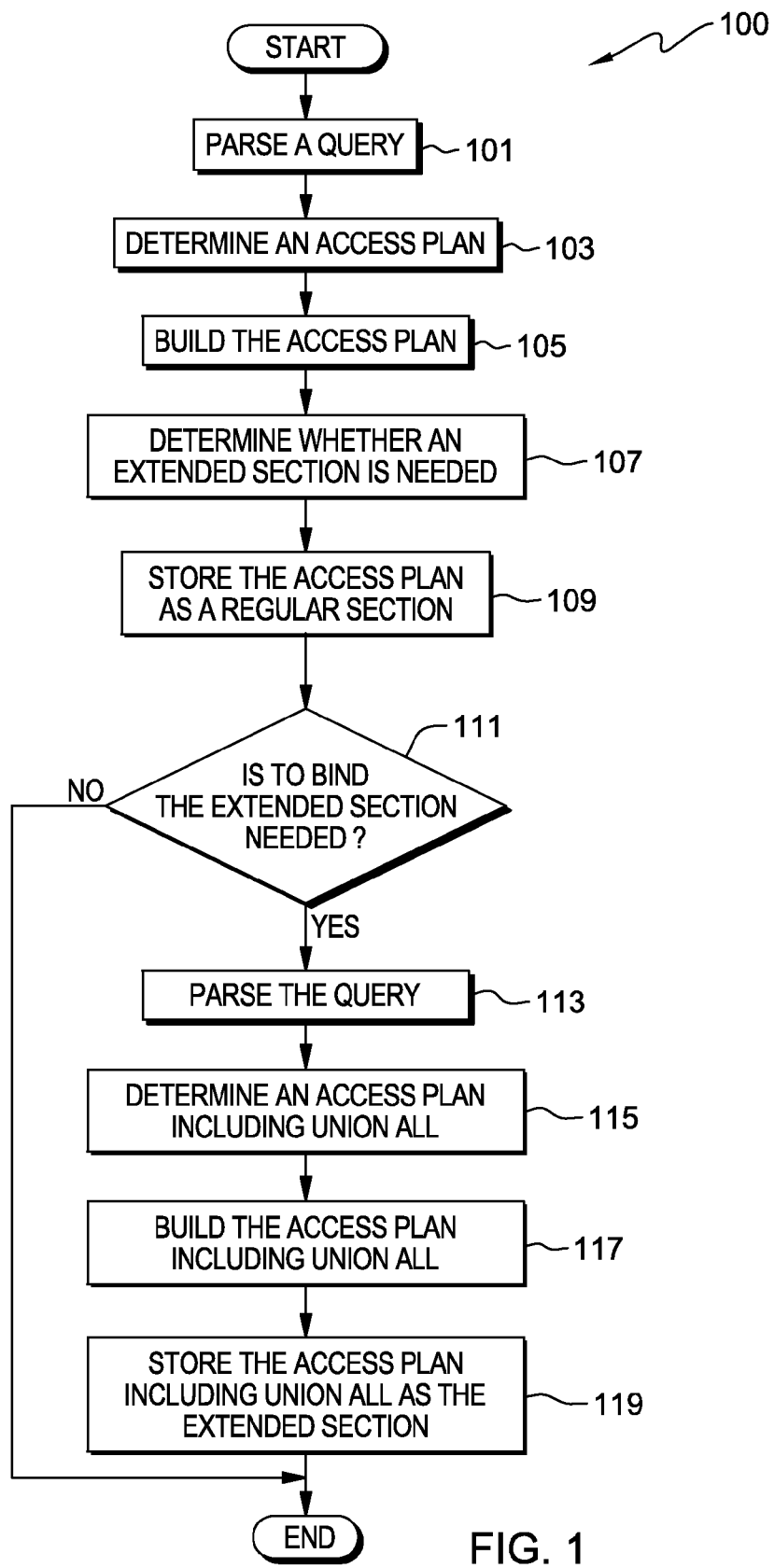
FIG. 1 is a flowchart illustrating operational steps of a bind/rebind/auto bind process, in accordance with one embodiment of the present invention.

Usually an application with static SQL (Structured Query Language) statements is bound prior to execution. For SQL statements that are queries from database tables, this bind process chooses the best access path or access plan (such as index scan, table scan, hybrid join or sort-merge join, etc.), and query rewrite techniques are also exploited. The access path or access plan is the integral part of the bound form of the SQL statement. This bind process is also a preparation step where the individual statements' access plans are stored in a package in the database management system's catalog. Repetitive execution of the application loads the package and the statements' access plans, and follows their directions. Assuming most bound forms of static SQL statements in a packaged application are stored as a separate section with the best access path identified, each SQL statement will have exactly one access plan when the packaged application is bound.

During the bind process, when a query references a STT (System Temporal Table), two access plans will be created if the bind option SYSTIMESENSITIVE is enabled. One plan has the access from only the STT or active table, and the other plan contains the access from the STT union with the history table. These two plans are called regular and extended plans, respectively. A period specification is added to the extended plan so that execution of the extended plan can use a time stamp special register value (i.e., CURRENT TEMPORAL SYSTEM_TIME) to select the qualified rows in both STT and history tables. Both regular and extended plans are stored as sections of the application's package in the catalog with the same identification for the query, such as package's name, package's collection ID, statement number, query number, and statement's bind status.

When the application is executed, users can use a SQL SET CURRENT TEMPORAL SYSTEM_TIME statement to indicate the time period that their queries are to operate on. If current time's data is needed, there is no need to specify this SET statement and the CURRENT TEMPORAL SYSTEM_TIME special register is null. When an application's package is executed, depending on whether the special register CURRENT TEMPORAL SYSTEM_TIME is set or not, either the regular plan or extended plan for the queries referencing the STT is loaded into memory for execution. Assuming users have a need to switch to a different time period only when executing one instance of the package, the special register will be either set or not for the life of the package's execution. Thus, this method loads and processes only one plan and can efficiently switch to another plan at any time. This method effectively prevents the frequent and costly incremental rebind of the query on the fly and does not always generate the expensive UNION ALL access plan with pruning predicate on the history table. Moreover, once the special register is set for the time period, queries referencing the STT in nested user-defined function, stored procedure, and/or trigger can also automatically take advantage of the performance benefit mentioned. Therefore, this method works automatically for nested SQL statements indirectly invoked through the user-defined function, the stored procedure, and/or the trigger.

Similar to temporal tables, the above technology can be applied to an archive transparency environment. In an archive transparency concept, an archive-enable table (AET) and an archive table can be established to contain active, hot data and archived, cold data respectively. From time to time, applications with queries referencing AET may need to get a result from only the AET or both the AET and the archive table. The SQL statements can be written with only referencing the AET. Such application's package can be bound with the ARCHIVESENSITIVE option where extended sections can be created as well as regular sections for those queries. The two access plans for a query are saved in the package. During execution, a GET_ARCHIVE global variable can be set to indicate which plan is to be used such that storage consumption is efficient and performance is optimal. There is no overhead when the GET_ARCHIVE variable is not set because the regular section is executed and it only accesses the AET.

Now, the method for using multiple plans to achieve temporal and archive transparency performance is described in an example as follows.

Assuming there exists a regular table RT, a system temporal table STT and its history table STT_HIST, consider an application with the following static SQL queries:

```
1.  SELECT * FROM RT;
2.  SELECT * FROM STT, RT
    WHERE STT.ID = 123 AND
    RT.ID = STT.ID;
3.  DELETE FROM RT
    WHERE C1 = 'ABC';
4.  INSERT INTO RT SELECT * FROM STT;
```

When the above application's package is bound with the SYSTIMESENSITIVE bind option set to NO, there are 4 access plans created (section numbers 1, 2, 3, and 4, respectively) for the 4 static SQL statements with statement numbers 1, 2, 3, and 4, respectively. The plans for statements 2 and 4 are to query from the tables STT and RT only. These 4 accessed plans or sections are stored in the package individually and loaded when the statements are executed.

However, when the application's package is bound with the SYSTIMESENSITIVE bind option set to YES, beside the above 4 plans (or sections), the package will have 2 additional sections. Statement 2 has an extended access plan created and saved as section number 5, since it references a STT. Similarly, statement 4 has its extended access plan created and saved as section number 6. Section numbers 5 and 6 have, in their access plans, the time period specification which is an UNION between the STT and its history table STT_HIST.

The compiled form of statement 2 for section number 5 can be rewritten as:

```
SELECT * FROM STT FOR SYSTEM_TIME AS OF
    CURRENT TEMPORAL SYSTEM_TIME, RT
    WHERE STT.ID = 123 AND
    RT.ID = STT.ID
```

It is also equivalent to:

```
SELECT * FROM (SELECT * FROM STT
    WHERE SYS_START <= CURRENT TEMPORAL
    SYSTEM_TIME AND
        SYS_END > CURRENT TEMPORAL SYSTEM_TIME
    UNION ALL
    SELECT * FROM STT_HIST
    WHERE SYS_START <= CURRENT TEMPORAL
        SYSTEM_TIME AND SYS_END > CURRENT
    TEMPORAL SYSTEM_TIME) STT, RT
WHERE STT.ID = 123 AND
RT.ID = STT.ID
```

The compiled form of statement 4 for section number 6 can be rewritten as:

```
INSERT INTO RT SELECT * FROM STT FOR SYSTEM_TIME
    AS OF CURRENT TEMPORAL SYSTEM_TIME;
```

It is also equivalent to:

```
INSERT INTO RT SELECT * FROM (SELECT * FROM STT
    WHERE SYS_START <= CURRENT TEMPORAL
        SYSTEM_TIME AND SYS_END > CURRENT TEMPORAL
        SYSTEM_TIME
    UNION ALL
    SELECT * FROM STT_HIST
    WHERE SYS_START <= CURRENT TEMPORAL
        SYSTEM_TIME AND SYS_END > CURRENT TEMPORAL
        SYSTEM_TIME) STT;
```

The section number 2 keeps track of its extended section which is section number 5. Similarly, section number 4 remembers its extended section which is section 6. The section number is used to search and load an access plan later; therefore, the assignment of section numbers for extended sections can be based on the maximum number of regular sections or unique statements in a given package, so long as it results in unique section numbers. The compilation process to bind these extended sections may occur during or after binding of all regular sections. This process starts from parsing the same statement text to access path selection to a new bound form of the rewritten statement. The bind process of an application's package typically is not repeated often once the access plans are well tested and users are satisfied with the query's performance.

Table 1 shows the bind output of queries in the package saved in the catalog. In Table 1, the package is bound with SYSTIMESENSITIVE(YES).

TABLE 1

| Package Collid | Package Name | Statement # | Query # | Statement Status | Section # | Statement Text |
|---|---|---|---|---|---|---|
| COLLA | PKGA | 1 | 1 | Compiled | 1 | SELECT * FROM RT |
| COLLA | PKGA | 2 | 2 | Compiled | 2 | SELECT * FROM STT, RT WHERE STT.ID = 123 AND RT.ID = STT.ID |
| COLLA | PKGA | 3 | 3 | Compiled | 3 | DELETE FROM RT WHERE C1 = 'ABC' |
| COLLA | PKGA | 4 | 4 | Compiled | 4 | INSERT INTO RT SELECT * FROM STT |
| COLLA | PKGA | 2 | 2 | Compiled | 5 | SELECT * FROM STT, RT WHERE STT.ID = 123 AND RT.ID = STT.ID |
| COLLA | PKGA | 4 | 4 | Compiled | 6 | INSERT INTO RT SELECT * FROM STT |

During execution of the application, if the special register CURRENT TEMPORAL SYSTEM_TIME is not set, the package with the bind option SYSTIMESENSITIVE value of YES only loads sections 2 and 4 when statements 2 and 4 are executed. Sections 2 and 4 only access the regular table RT and the system temporal table STT. On the other hand, if the special register CURRENT TEMPORAL SYSTEM_TIME is set to a valid time stamp, sections 5 and 6 are loaded into memory when statements 2 and 4 are referenced. These extended sections access the regular table RT and the system temporal table STT UNION ALL its history table STT_HIST. These extended sections, since having the UNION ALL operation with the history table, require more storage than their corresponding regular sections 2 and 4, and more processor time to load into memory. By separating the UNION ALL access plan into a separate section, there is no unnecessary overhead in terms of storage or no processor time consumption because only the needed access plan is used. Information in the database management system's catalog, instrumentation, and explain output can be provided to identify extended sections built during the bind process and to identify which one is used at execution time.

The package with bound forms of static SQL statements depends on tables which are created as either regular or system temporal tables, and this method rewrites the queries to be sensitive to this fact. Therefore, when a table is altered from regular to STT and vice versa, the package may need to be invalidated. When such DDL is done, the package bound with a SYSTIMESENSITIVE option of YES is autobound on the first execution, and the process which evaluates whether an extended section should be created can take effect.

This method also calls for attention when there are positioned UPDATE or DELETE SQL statements with regard to a cursor which have both regular and extended sections. A database management system typically is designed so that positioned UPDATE and DELETE sections are logically tied to the cursor section. After a row in the cursor is fetched, the positioned UPDATE can update that row. If all these related statements are static SQL, the bind process decides to tie the positioned UPDATE and DELETE to the regular cursor section or the extended cursor section. Then, at execution, only one of the cursor sections is actually opened and fetched. When the positioned UPDATE or DELETE section is executed, it needs to locate the cursor section currently in effect in order to update the correct fetched row. Again, this technique is enhanced to cover the related SQL statements by keeping track of the extended section number in the regular section.

Embodiments of the present invention will now be described in detail with reference to the accompanying drawings.

FIG. 1 is flowchart 100 illustrating operational steps of a bind/rebind/auto bind process, in accordance with one embodiment of the present invention. At step 101, a computer system parses a query. In the embodiment, the query is a SQL statement. The example described in the earlier paragraph of this document shows 4 SQL statements. At step 103, the computer system determines an access plan. At step 105, the computer system builds the access plan. The access plan is the integral part of the bound form of the SQL statement and specifies an order of operations for accessing data. At step 107, the computer system determines whether an extended section is needed. In the example described in the earlier paragraph of this document, the extended section is needed for statement 2 or statement 4. At step 109, the computer system stores the access plan as a regular section. In the example described in the earlier paragraph of this document, sections 1, 2, 3, and 4 are stored as regular sections for statements 1, 2, 3, and 4, respectively. In the example, sections 1, 2, 3, and 4 are for accessing the regular table RT and the system temporal table STT. At decision block 111, the computer system determines whether to bind the extended section is needed. In response to determining that to bind the extended section is needed (YES branch of decision block 111), at step 113, the computer system parses the same query. At step 115, the computer system determines an access plan including UNION ALL. At step 117, the computer system builds the access plan including UNION ALL. At step 119, the computer system stores the access plan including UNION ALL as the extended plan. In the example described in the earlier paragraph of this document, section 5 is stored as the extended plan for statement 2 and section 6 is stored as the extended plan for statement 4. In the example, sections 5 and 6 are for accessing the regular table RT and the system temporal table STT UNION ALL its history table STT_HIST.

Figure 2:
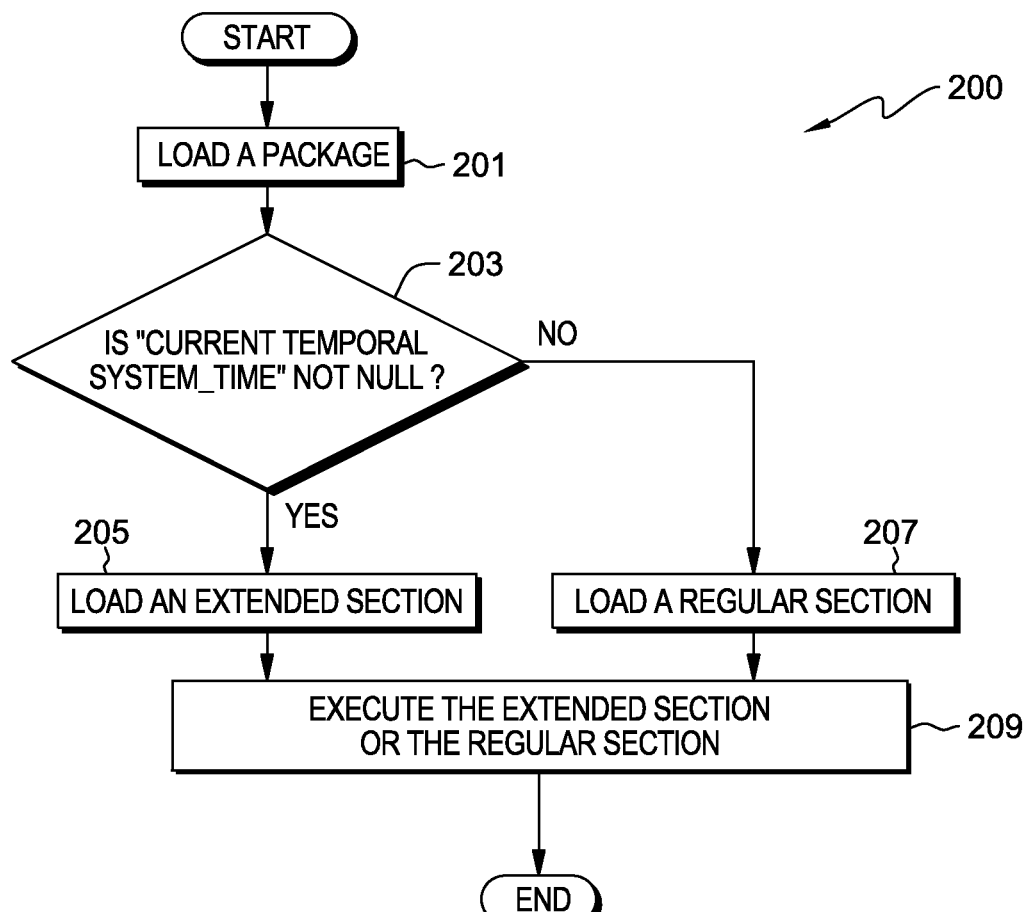
FIG. 2 is a flowchart illustrating operational steps of an execution process, in accordance with one embodiment of the present invention.

FIG. 2 is flowchart 200 illustrating operational steps of an execution process, in accordance with one embodiment of the present invention. At step 201, the computer system loads a package. The package includes the regular sections and the extended sections. At decision block 203, the computer system determines whether "CURRENT TEMPORAL SYSTEM_TIME" is not null. In response to determining that "CURRENT TEMPORAL SYSTEM_TIME" is null (NO branch of decision block 203), at step 207, the computer system loads a regular section. In the example described in the earlier paragraph of this document, the computer system loads sections 2 and 4 when statements 2 and 4 are referenced. In response to determining that "CURRENT TEMPORAL SYSTEM_TIME" is not null (YES branch of decision block 203), at step 205, the computer system loads an extended section. In the example described in the earlier paragraph of this document, sections 5 and 6 are loaded when statements 2 and 4 are referenced. At step 209, the computer system executes the extended section following step 205 or executes the regular section following step 207. In the example described in the earlier paragraph of this document, when regular sections 2 and 4 are executed, only the regular table RT and the system temporal table STT are accessed; when extended sections 5 and 6 are executed, the regular table RT and the system temporal table STT UNION ALL its history table STT_HIST are accessed.

Figure 3:
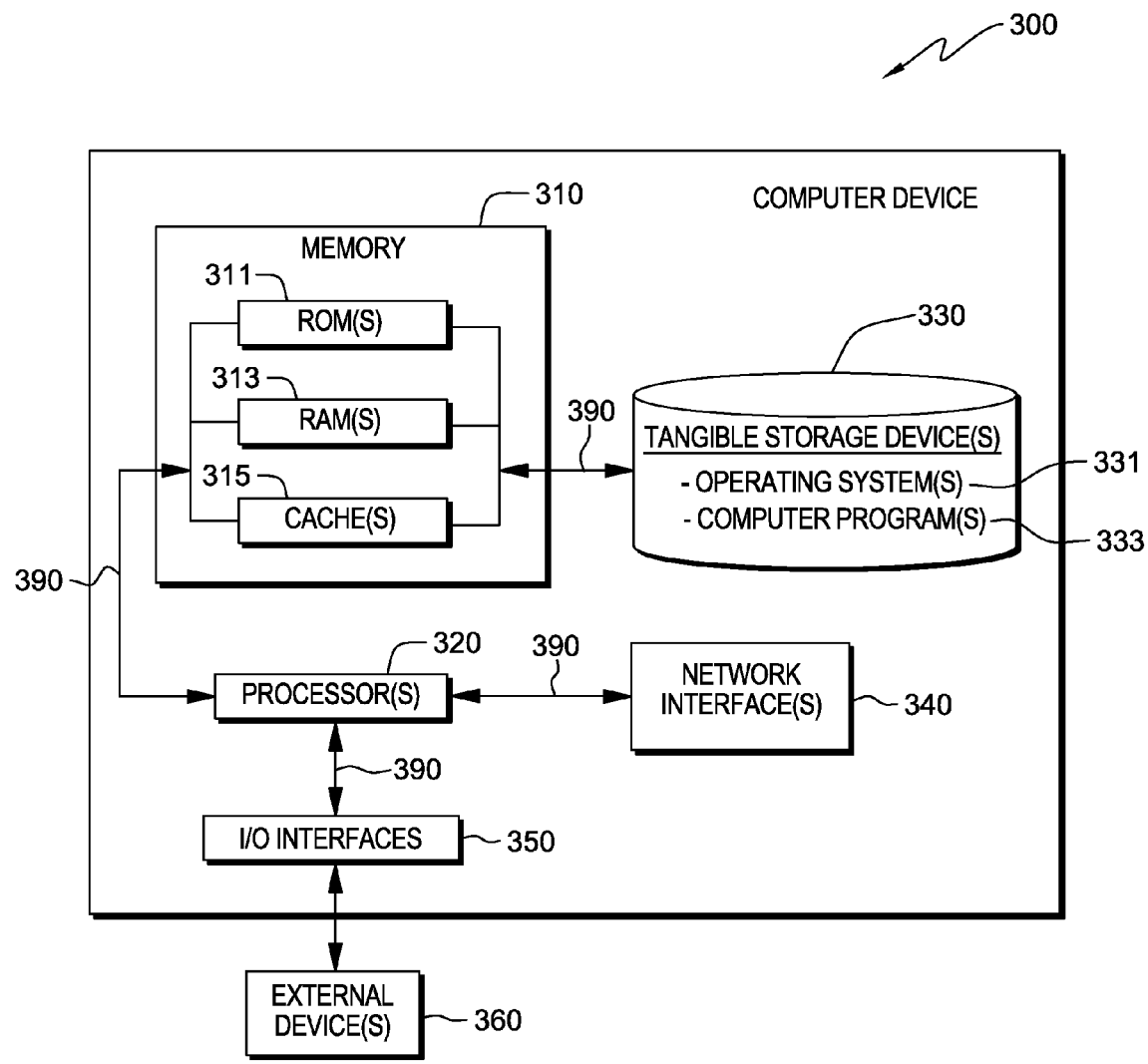
FIG. 3 is a diagram illustrating components of a computer system hosting one or more programs for the processes shown in FIGS. 1 and 2, in accordance with one embodiment of the present invention.

FIG. 3 is a diagram illustrating components of a computer system hosting one or more programs for the processes shown in FIGS. 1 and 2, in accordance with one embodiment of the present invention. It should be appreciated that FIG. 3 provides only an illustration of one implementation and does not imply any limitations with regard to the environment in which different embodiments may be implemented. In other embodiments, one or more programs for the processes shown in FIGS. 1 and 2 may reside respectively on computing devices. In yet other embodiments, one or more programs for the processes shown in FIGS. 1 and 2 may hosted by multiple computer devices which are connected by a network.

Referring to FIG. 3, computing device 300 includes processor(s) 320, memory 310, tangible storage device(s) 330, network interface(s) 340, and I/O (input/output) interface(s) 350. In FIG. 3, communications among the above-mentioned components of computing device 300 are denoted by numeral 390. Memory 310 includes ROM(s) (Read Only Memory) 311, RAM(s) (Random Access Memory) 313, and cache(s) 315.

One or more operating systems 331 and one or more computer programs 333 reside on one or more computer-readable tangible storage device(s) 330. In accordance with one embodiment of the present invention, one or more programs for the processes shown in FIGS. 1 and 2 reside on at least one of one or more computer-readable tangible storage device(s) 330.

Computing device 300 further includes I/O interface(s) 350. I/O interface(s) 350 allow for input and output of data with external device(s) 360 that may be connected to computing device 300. Computing device 300 further includes network interface(s) 340 for communications between computing device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for using multiple plans in a database management system to access current data and history data, the method comprising:
   building, by a computer, a first access plan for a query, wherein the first access plan is an integral part of a bound form of a statement and specifies an order of operations for accessing data;
   storing, by the computer, the first access plan as a first section in an application package, wherein the first section is for accessing a regular table and a system temporal table;
   determining, by the computer, whether a bind option for the query is detected;
   in response to determining that the bind option is detected, building, by the computer, a second access plan for the query, wherein the second access plan includes UNION ALL;
   storing, by the computer, the second access plan as a second section in the application package, wherein the second section is for accessing the regular table and the system temporal table, and a history table;
   loading, by the computer, the application package;
   loading and executing, by the computer, the first section, in response to determining that a register CURRENT TEMPORAL SYSTEM_TIME is not set; and
   loading and executing, by the computer, the second section, in response to determining that the register CURRENT TEMPORAL SYSTEM_TIME is set to a valid time stamp.

2. The computer-implemented method of claim 1, wherein the first section and the second section have a same identification for the query.

3. The computer-implemented method of claim 1, wherein the query is a static Structure Query Language (SQL) statement.

4. A computer program product for using multiple plans in a database management system to access current data and history data, the computer program product comprising a computer readable storage medium having program code embodied therewith, the program code executable to:
   build, by a computer, a first access plan for a query, the first access plan capable of accessing the current data, wherein the first access plan is an integral part of a bound form of a statement and specifies an order of operations for accessing data;
   store, by the computer, the first access plan as a first section in an application package, wherein the first section is for accessing a regular table and a system temporal table;
   determine, by the computer, whether an bind option for the query is detected;
   in response to determining that the bind option is detected, build, by the computer, a second access plan for the query, wherein the second access plan includes UNION ALL;
   store, by the computer, the second access plan as a second section in the application package, wherein the second section is for accessing the regular table and the system temporal table, and a history table;
   load, by the computer, the application package;
   load and execute, by the computer, the first section, in response to determining that a register CURRENT TEMPORAL SYSTEM_TIME is not set; and
   load and execute, by the computer, the second section, in response to determining that the register CURRENT TEMPORAL SYSTEM_TIME is set to a valid time stamp.

5. The computer program product of claim 4, wherein the first section and the second section have a same identification for the query.

6. The computer program product of claim 4, wherein the query is a static Structure Query Language (SQL) statement.

7. A computer system for using multiple plans in a database management system to access current data and history data, the computer system comprising:
   one or more processors, one or more computer-readable tangible storage devices, and program instructions stored on at least one of the one or more computer-readable tangible storage devices for execution by at least one of the one or more processors, the program instructions executable to:
   build, by a computer, a first access plan for a query, the first access plan capable of accessing the current data, wherein the first access plan is an integral part of a bound form of a statement and specifies an order of operations for accessing data;
   store, by the computer, the first access plan as a first section in an application package, wherein the first section is for accessing a regular table and a system temporal table;
   determine, by the computer, whether an bind option for the query is detected;

in response to determining that the bind option is detected, build, by the computer, a second access plan for the query, wherein the second access plan includes UNION ALL;

store, by the computer, the second access plan as a second section in the application package, wherein the second section is for accessing the regular table and the system temporal table, and a history table;

load, by the computer, the application package;

load and execute, by the computer, the first section, in response to determining that a register CURRENT TEMPORAL SYSTEM_TIME is not set; and load and execute, by the computer, the second section, in response to determining that the register CURRENT TEMPORAL SYSTEM_TIME is set to a valid time stamp.

8. The computer system of claim 7, wherein the first section and the second section have a same identification for the query.

9. The computer system of claim 7, wherein the query is a static Structure Query Language (SQL) statement.

* * * * *